United States Patent [19]
Mason

[11] Patent Number: 5,716,520
[45] Date of Patent: Feb. 10, 1998

[54] MAGNETIC FLUID CONDITIONER

[76] Inventor: Elmer B. Mason, 901 Vickie Dr., Del City, Okla. 73115

[21] Appl. No.: 699,762

[22] Filed: Aug. 20, 1996

[51] Int. Cl.$^6$ .................................................. C02F 1/48
[52] U.S. Cl. ...................... 210/222; 123/538; 166/66.5; 335/304
[58] Field of Search .................................. 210/222, 695; 123/538; 166/66.5

[56] References Cited

U.S. PATENT DOCUMENTS

| | | | |
|---|---|---|---|
| 3,412,352 | 11/1968 | Watson | 335/298 |
| 4,532,040 | 7/1985 | Meeks et al. | 210/222 |
| 5,178,757 | 1/1993 | Corney | 210/222 |
| 5,366,623 | 11/1994 | Clair | 210/222 |

FOREIGN PATENT DOCUMENTS 2253946  3/1991  United Kingdom.

*Primary Examiner*—David A. Reifsnyder

[57] ABSTRACT

A magnetic flux fluid treating device for minimizing the discharge of hydrocarbons from internal combustion engines, eradicating scale and inhibiting its formation in water conduits and water handling equipment is formed by a coaxial soft iron tubular assembly connected with the units containing the fluid to be treated. Magnetic flux field generating units are interposed in the annuli formed by the tubular members and define lateral limits of the annuli fluid passageways. The flux field forms a south monopole and a north monopole of the innermost and outermost tubes of the assembly and a repelling force flux field in the passageways and fluid normal to the direction of flow and the coaxes of the tube assembly.

14 Claims, 8 Drawing Sheets

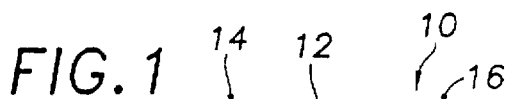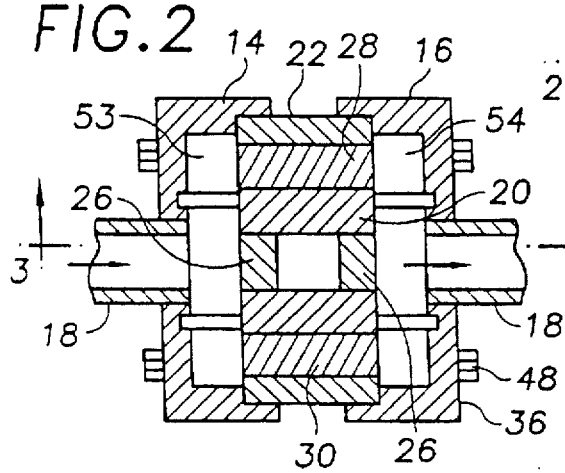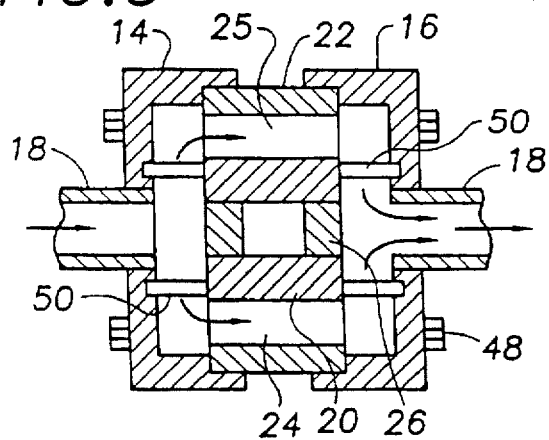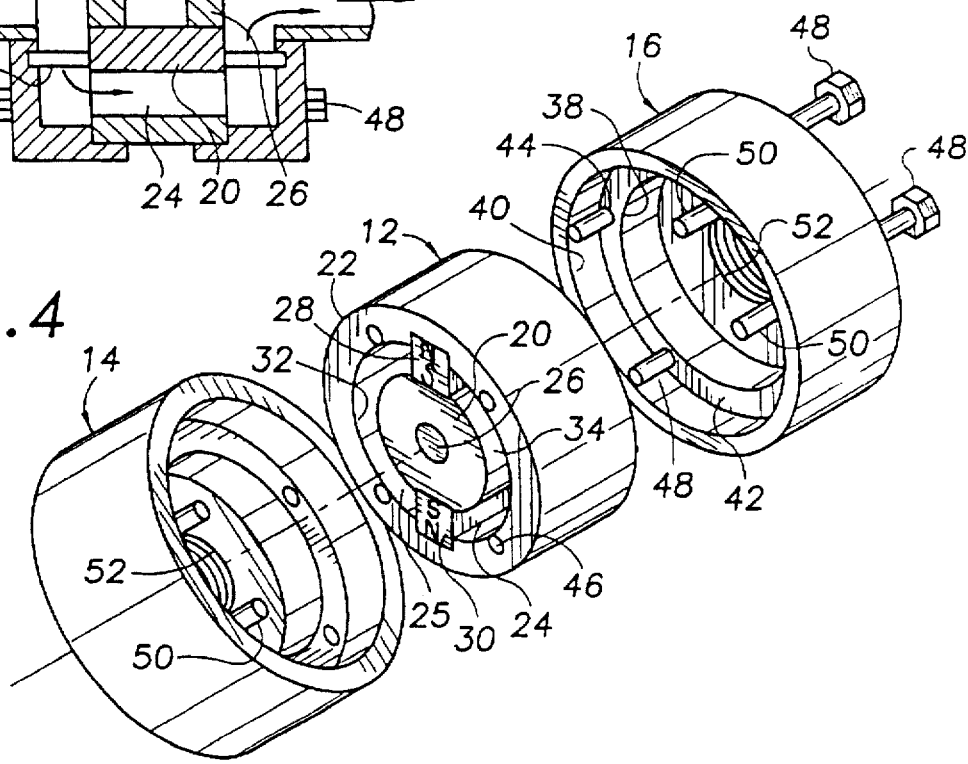

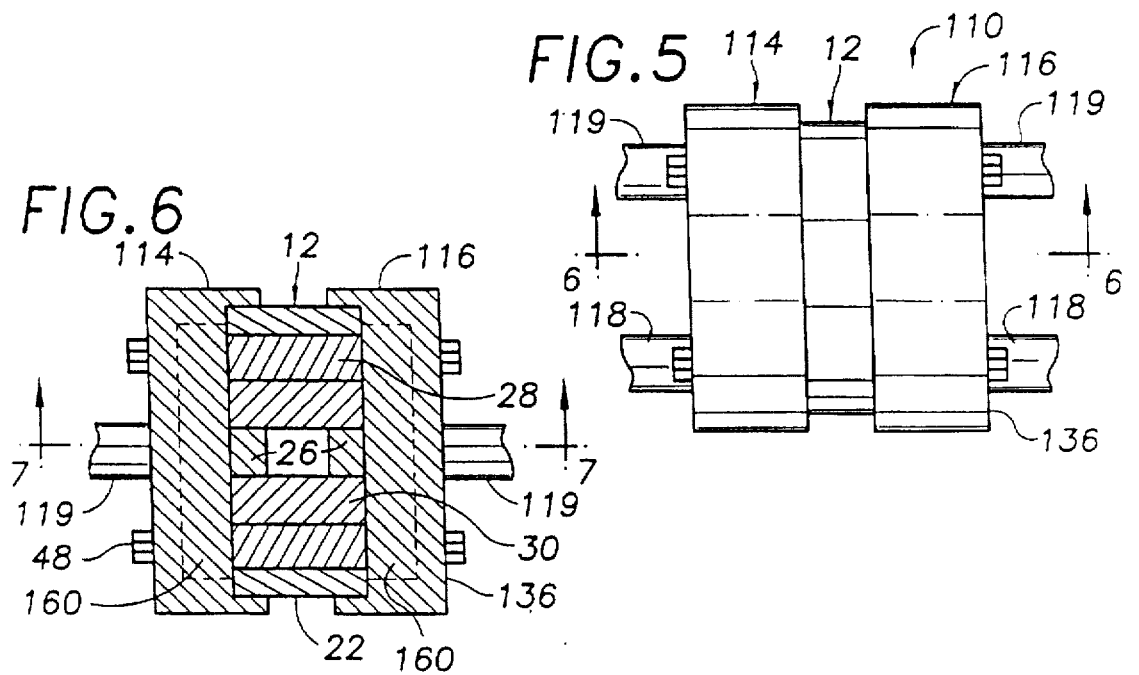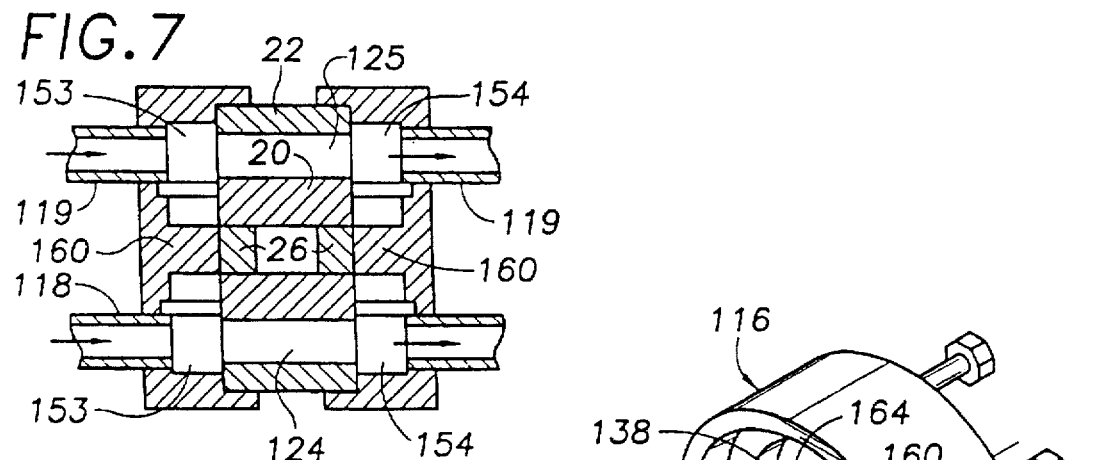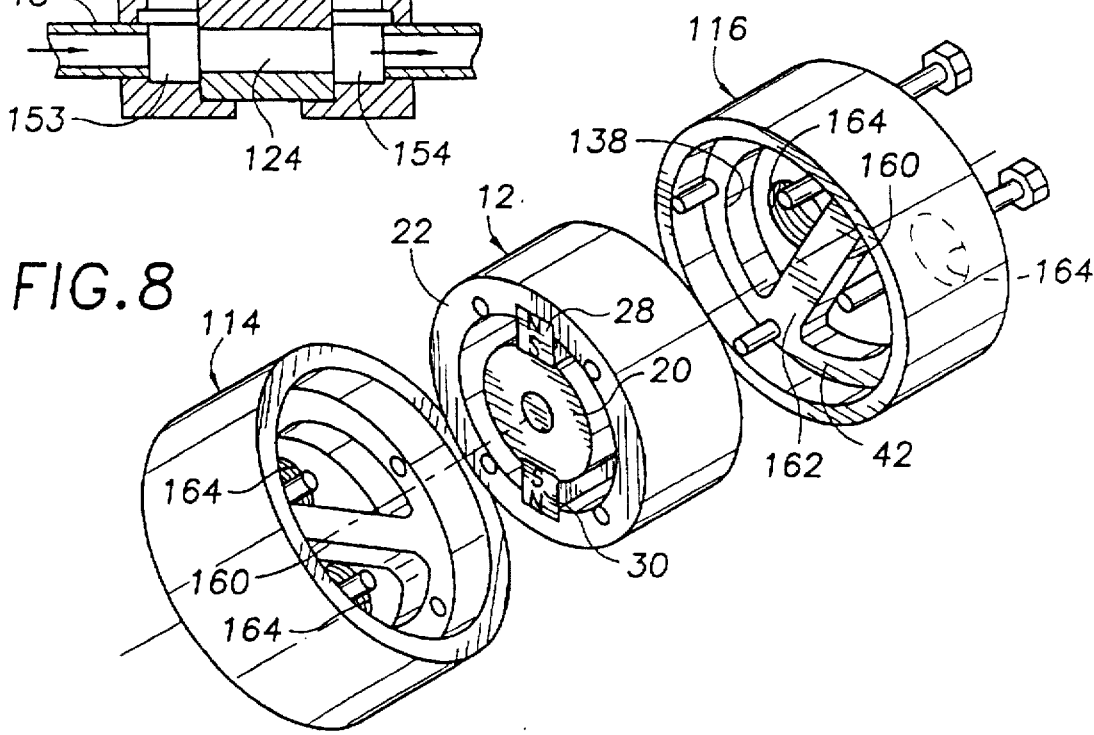

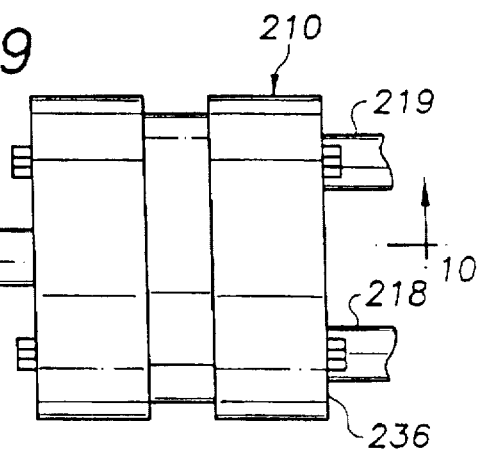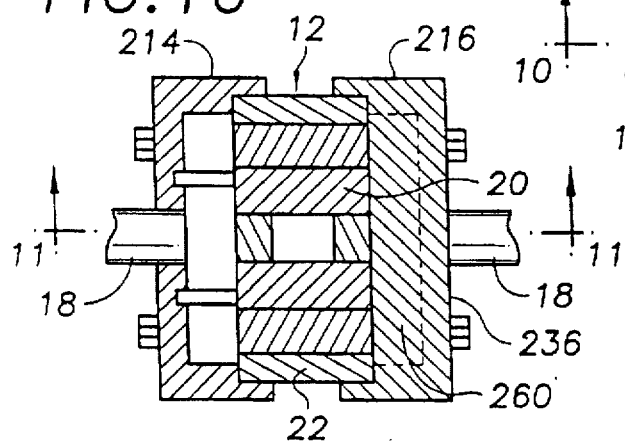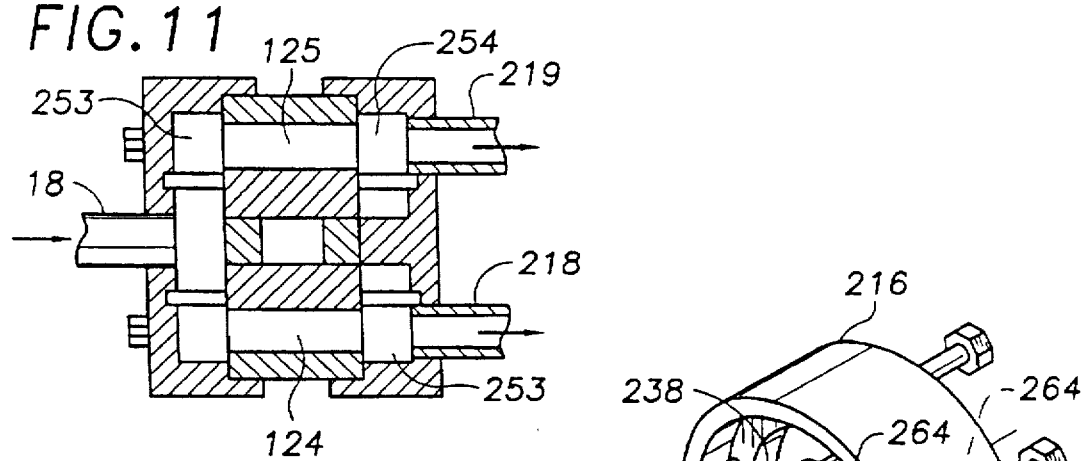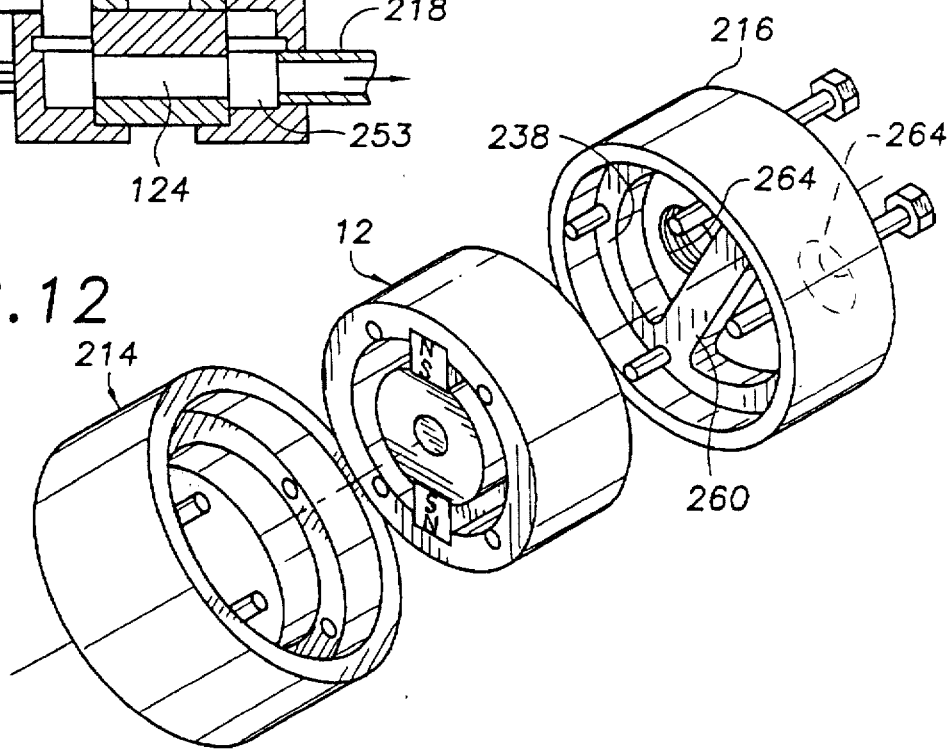

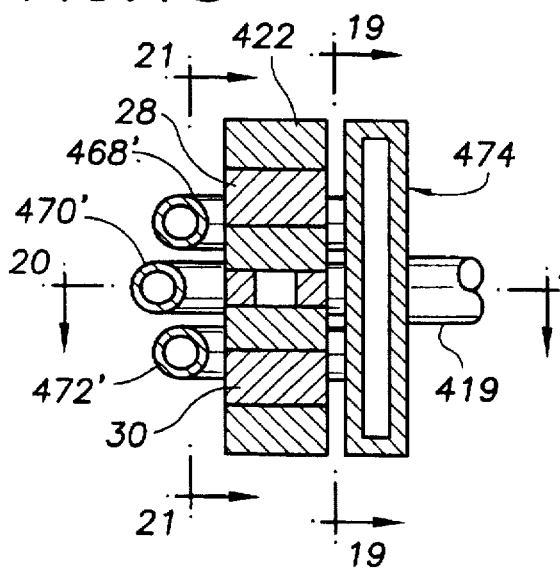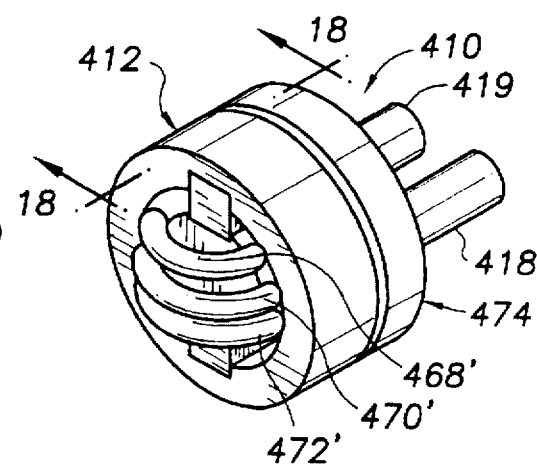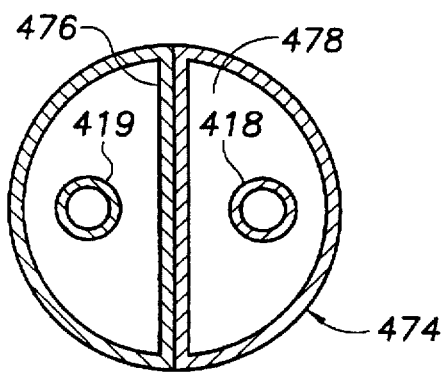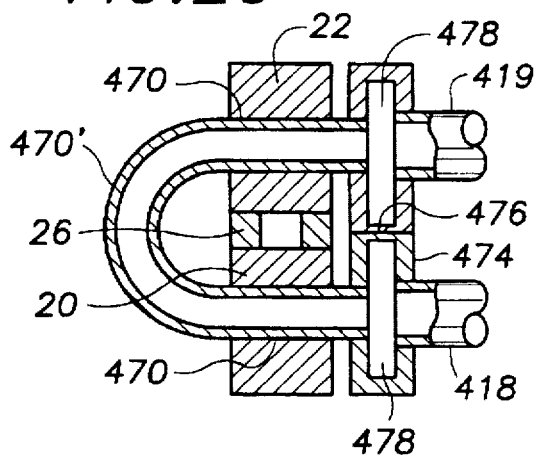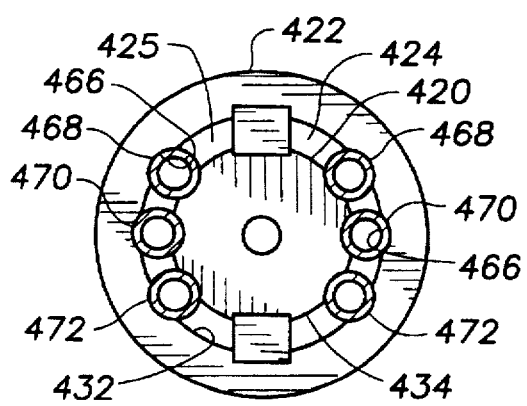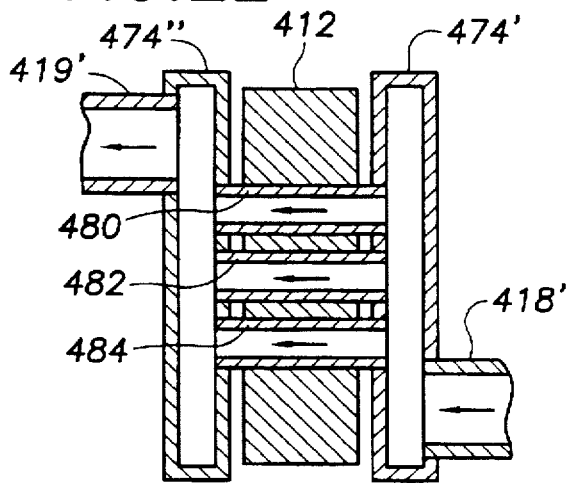

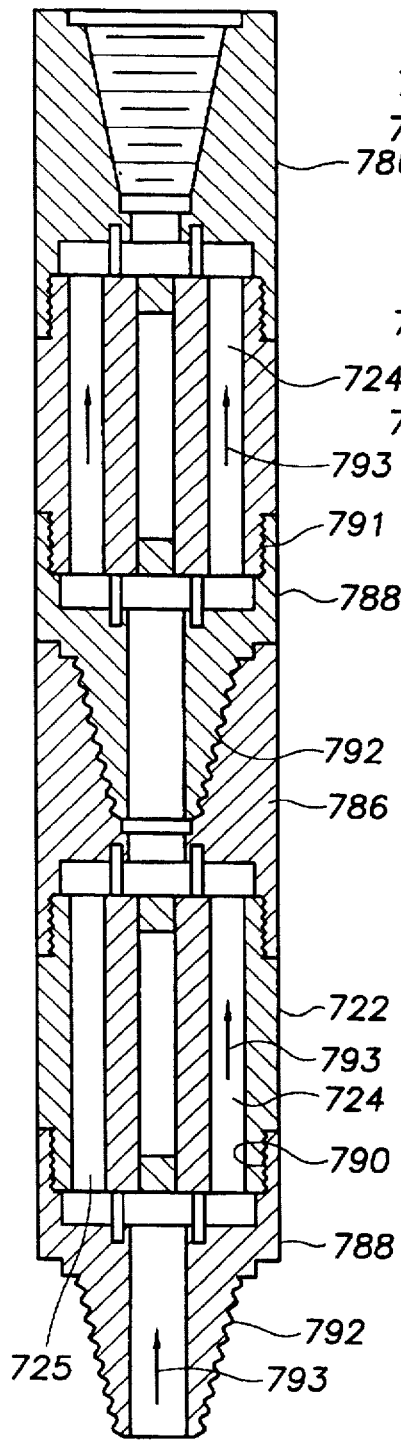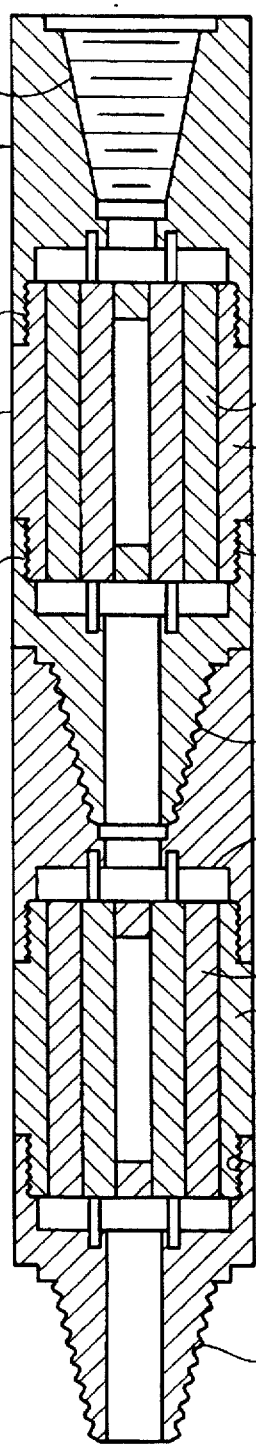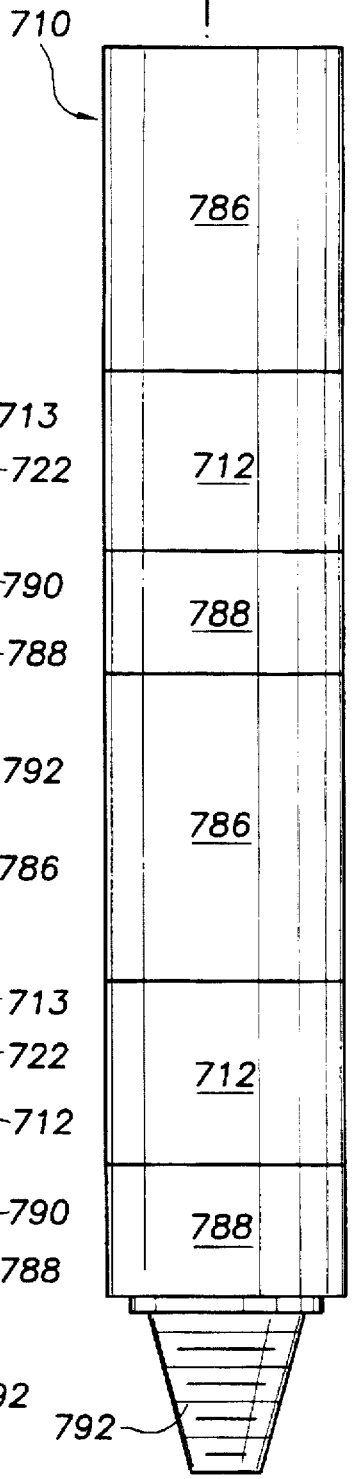

MAGNETIC FLUID CONDITIONER

This application claims the benefit of U.S. Provisional Application No. 60/002,956, filed Aug. 30, 1995.

BACKGROUND OF THE INVENTION

1. Field of the Invention

The present invention relates to magnetohydrodynamics and more particularly to structure for exposing electrically conductive fluid to a magnetic flux field to increase fuel efficiency and inhibit scale formation in fluid conduits and other equipment.

Air pollution and fuel consumption are two problems currently addressed nationally and by municipalities. In metropolitan areas, a large part of air pollution is a result of inefficient burning of hydrocarbon fuel particularly by internal combustion engines either mobile or stationary.

One embodiment of this invention magnetically conditions fuel for more efficient burning as it moves through a fuel line to an adjacent point of combustion or burning which results in a decrease in the unburned hydrocarbons discharged to the atmosphere and an increase in miles per gallon on mobile equipment and a reduction of fuel used in stationary engines.

In another embodiment of the invention, an electrically conductive fluid stream is moved through a magnetic flux field at right angle to the field origin which induces electron excitation in the conductive fluid and minimizes and reduces scale formation forming on the walls of heat exchangers, pump impellers, and the walls of conduits.

The fluid conductivity is related to the dissolved solids in suspension. When the fluid is water containing salts, the scale coating the interior of tubes and other equipment, such as boilers, is usually calcium sulfate.

The fluid conductivity and its velocity relates directly to the electron excitation. The unbalance of outer valences of atoms result in either positively or negatively charged atoms.

This device tends to correct the valence unbalance which interferes with the ionic bonding that occurs in supersaturated fluid. The electron excitation creates an environment where atoms of different charges may expel a free electron or absorb a free electron to satisfy its valence unbalance. The resulting neutral atom has less affinity to bond ionically than charged atoms. This does not change the chemical structure of the fluid or removing any contained in suspension.

Rather than bonding to a crystal of high physical, such as an ice cube, dissolved solids contain the same chemical substance, but with a low physical, such as a snowflake. The physical structure of a snowflake will not support mass or resist flow impact, therefore, a light powdery film forms and since the ionic bonding is not capable of supporting the mass, the film when it tends to grow, drops off and is washed away by passing fluid.

Old scale accumulated on the walls of tubes, heaters, etc. by a turbid fluid containing particulate matter in suspension is usually struvite. A rock hard mineral scale having a hardness rating of 2, on the Rockwell hardness scale, consisting of hydrous ammonium magnesium phosphate.

The struvite scale build up in an electric motor driven centrifugal pump will progressively increase until it "freezes" the pump impeller and results in burning out the electrical motor driving the pump.

The crystal lattice structure of the struvite is formed by ionic bonding and as large structures normally have a low surface charge and may be either paramagnetic or diamagnetic crystal structures, both reacting to intense magnetic fields.

The crystals in turbid fluid are in a nondescript pattern but when entering the magnetic field of this apparatus they attempt to align with the force field and to align must physically rotate. The viscus nature of the turbid fluid prevents an easy access rotation which tensions the crystal structure and tends to distort it which activates the stretching of the linking of the magnetic domains compression areas and elongation areas of crystal surface.

The low physical of some of the crystals permit them to fracture or break resulting in a change of the state-of-the-surface charge to higher potential. When the charged particle is carried downstream into the scaled area it is in an unnatural state, tending to return to its original potential.

As the charged particle moves with the stream in a scaled pipe which has a lower potential (a half-charge), charge is transferred by contact. At a point in time and distance, directly related to the deposit condition of flow velocity, the charged particle has lost all of its induced charge by repeated contacts between it and the scale of the pipe and returned to its natural state.

The distance affected in a line is directly related to the differences in potential, velocity of the fluids and the number of contacts. The old scale bonding is ionic, by providing the charge of free electrons from the particle, progressively interferes with the ionic bonding. The scale does not go away, only the physicals related to ionic bonds are affected. The result is the rock hard brown scale deposit changes to a brown scale deposit with a consistency as smooth as peanut butter.

The abrasion of passing fluids abrades this soft material and it is carried downstream with the passing fluids if the velocity is maintained. If the velocity changes to a flow insufficient to keep the abraded particles moving, they settle out in sump areas, traps, or blow downs and are removed by cleaning or flushing.

2. Description Of The Prior Art

United Kingdom patent No. 2,253,946 published Sep. 23, 1992 for MAGNETIC TREATMENT OF FLUIDS discloses treating hard water to minimize scale deposit by passing the water through a conduit interposed in a magnetic field between north and south pole plates in which a magnetizable element in the pipe insures intimate magnetic contact with the fluid moving through the pipe and the magnetizable wire mesh.

U.S. Pat. No. 3,412,352 issued Nov. 19, 1968 to Watson for MAGNETIC ASSEMBLIES FOR PRODUCING HIGHLY HOMOGENEOUS MAGNETIC FIELDS. This patent discloses forming a pair of opposite planar pole plates having electro or permanent magnets interposed between the plates to form opposite north and south poles and an air gap therebetween producing a magnetic field of high homogeneity between the respective north and south pole plates.

U.S. Pat. No. 4,532,040 issued Jul. 30, 1985 to Meeks et al for WATER TREATMENT DEVICE and U.S. Pat. No. 5,178,757 issued Jan. 12, 1993 to Corney for MAGNETIC FLUID CONDITIONING TOOLS are believed to represent the further state-of-the-art. The Meeks et al patent *040 discloses inner and outer rings of magnets equally spaced about the inner periphery of a casing forms an annulus between the inner and outer ring which permits fluid flow to maintain equal ionization of the passing fluid. The Corney *757 patent discloses a tubular member which includes a hollow core providing at least one passage for fluid flow and having oppositely disposed pairs of magnets longitudinally secured to the core to provide a magnetic field perpendicularly to the flow path.

This invention is believed distinctive over these and other similar patents by a structural arrangement of its components forming the boundaries of a flow passage and a magnetic flux density field normal to fluid moving through the flow passageway.

SUMMARY OF THE INVENTION

Briefly stated, this invention forms a flow passageway unit to be interposed in a fluid conduit in which the unit includes opposing polarity magnetic monopoles defining inner and outer boundaries of the flow passageway having oppositely disposed bar magnets interposed between and forming the magnetic monopoles and defining lateral limits of the flow passageways.

In one embodiment inner and outer tubular members preferably formed from magnetizable soft iron having substantially equal wall mass are assembled to define an annulus therebetween of predetermined cross sectional area.

Bar magnets preferably coextensive with the length of the tubular members are longitudinally oppositely interposed in the annulus with the north pole of each magnet in contiguous contact with the inner wall surface of the outer tube and the south pole of each magnet in contiguous contact with the outer surface of the inner tube, thus dividing the annulus to form two fluid passageways extending longitudinally through the tube members. The north poles of the two magnets contacting the outer tube and the south poles of the two magnets contacting the inner tube substantially doubles the magnetic flux field in the passageways substantially 90 degrees in both directions from the pair of magnets in which the magnetic flux field lines are normal to fluid flow through the passageways and the adjacent surfaces of the inner and outer monopole tubes. Stated another way, magnetic flux force from magnetically opposite like poles magnetizing the tubes meet or clash in a repelling action in the material of the respective tube, generating a two-fold magnetic flux field 90 degrees from the respective magnet. The north and south monopole repelling magnetic flux force forms a magnetic attracting force between adjacent tube surfaces and the respective pair of magnets forming the passageways. The bore of the innermost tube being plugged by nonmagnetic metal.

A pair of end caps form a chamber at each end of the tube assembly communicating with the passageways between the tubes. The end surface of each cap opposite the tube assembly is apertured for connection with one or more fluid carrying tubular members.

Structures according to the invention have been beneficial in the use of a plurality of internal combustion motor fuels by inducing the addition of electrons to atoms in the fuel resulting in a more volatile fuel. The fuel enhancing embodiment is preferably interposed in the fuel intake line near the combustion cylinders.

In a second water treatment version of the embodiments, the device is interposed in a fluid circulating line adjacent the intake of the heat exchanger or the inlet side of a pump.

The principal objects of this invention are: to provide a structure formed by a plurality of endless perimeter members and annuli therebetween having a common axis concentrating repelling magnetic flux force inwardly for inducing a magnetic polarity charge on ions in a conductive fluid flowing through the structure with minimum pressure drop across the structure; to remove or substantially eliminate scale build up on the inner surfaces of heat exchangers, fluid pump impellers and piping; and, which is relatively inexpensive in manufacture and contains no moving parts and has a relatively long useful life. Other and further objects will be apparent from the detailed description.

BRIEF DESCRIPTION OF THE DRAWINGS

FIG. 1 is a fragmentary elevational view of one embodiment of the device;

FIG. 2 is a vertical cross sectional view taken substantially along the line 2—2 of FIG. 1;

FIG. 3 is a vertical cross sectional view taken substantially along the line 3—3 of FIG. 2;

FIG. 4 is an exploded perspective view of the device;

FIG. 5 is a view similar to FIG. 1 illustrating another embodiment;

FIG. 6 is a vertical cross sectional view taken substantially along the line 6—6 of FIG. 5;

FIG. 7 is a vertical cross sectional view taken substantially along the line 7—7 of FIG. 6;

FIG. 8 is an exploded perspective view of this embodiment;

FIG. 9 is a view similar to FIG. 1 illustrating another embodiment;

FIG. 10 is a vertical cross sectional view taken substantially along the line 10—10 of FIG. 9;

FIG. 11 is a vertical cross sectional view taken substantially along the line 11—11 of FIG. 10;

FIG. 12 is an exploded perspective view of this embodiment;

FIG. 17 is a fragmentary perspective view of a further embodiment;

FIG. 18 is a vertical cross sectional view taken substantially along the line 18—18 of FIG. 17;

FIG. 19 is a vertical cross sectional view taken substantially along the line 19—19 of FIG. 18;

FIG. 20 is a vertical cross sectional view taken substantially along the line 20—20 of FIG. 18;

FIG. 21 is a vertical cross sectional view partially in elevation taken substantially along the line 21—21 of FIG. 18;

FIG. 22 is a vertical cross sectional view illustrating a modification of the device shown by FIG. 17;

FIG. 27 is an elevational view of an additional embodiment;

FIG. 28 is a longitudinal sectional view taken substantially along the line 28—28 of FIG. 27;

FIG. 29 is a longitudinal sectional view taken substantially along the line 29—29 of FIG. 28.

DESCRIPTION OF THE PREFERRED EMBODIMENTS

Figure 13:
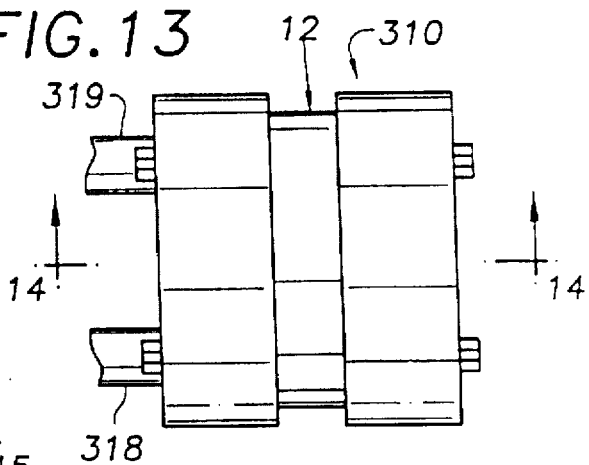
FIG. 13 is a view similar to FIG. 1 of another embodiment.
Figure 14:
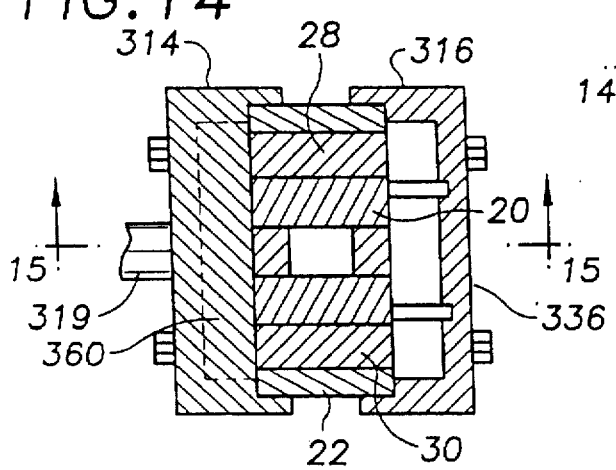
FIG. 14 is a vertical cross sectional view taken substantially along the line 14—14 of FIG. 13.
Figure 15:
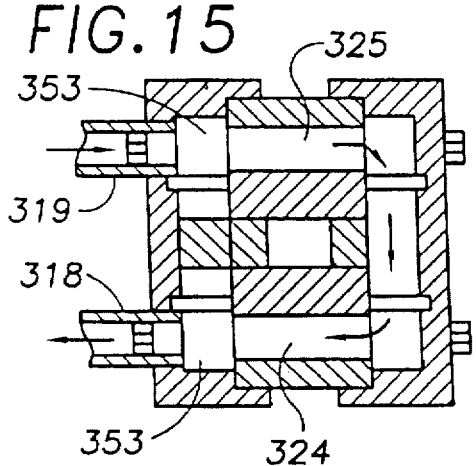
FIG. 15 is a vertical cross sectional view taken substantially along the line 15—15 of FIG. 14.
Figure 16:
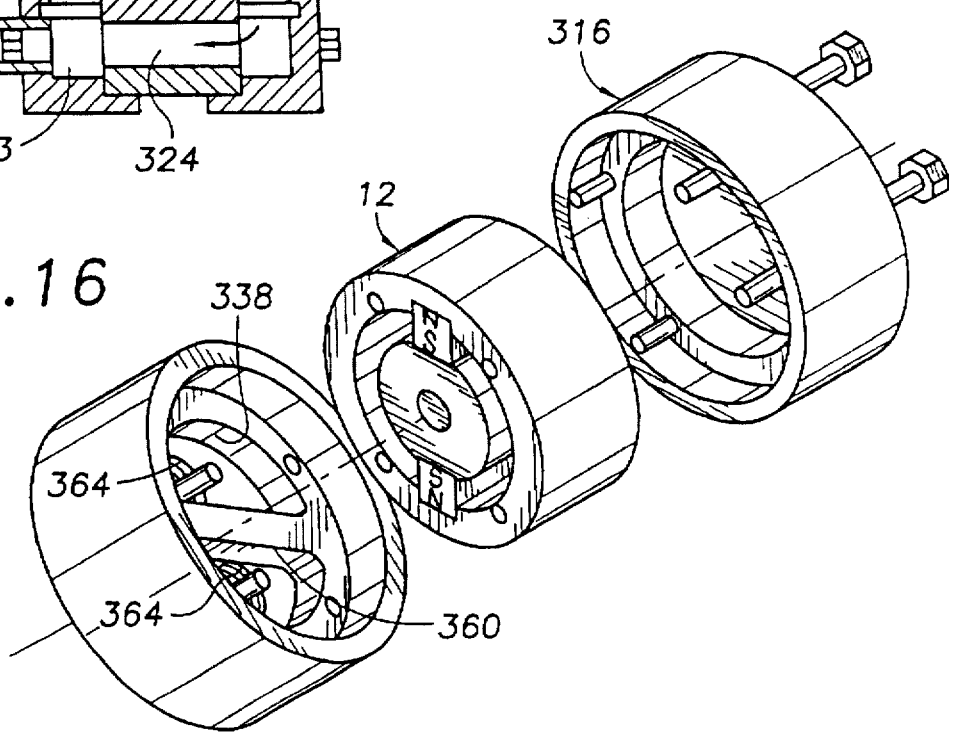
FIG. 16 is an exploded perspective view of this embodiment.

Like characters of reference designate like parts in those figures of the drawings in which they occur.

Referring first to FIGS. 1–4, the reference numeral 10 indicates the device as a whole which is cylindrical in general configuration formed by a coaxial tube assembly 12 closed at its respective ends by apertured end caps 14 and 16 interposed in a fluid flow line 18.

The tube assembly 12 comprises inner and outer substantially concentric tubular members 20 and 22 of selected diameter and length and having wall surfaces of substantially equal mass for defining an annulus therebetween of predetermined cross sectional area sufficient to accommodate liquid flow through the flow line 18 with minimum pressure reduction across the position of the tube assembly 12 for the reasons believed obvious.

Both the inner and outer cylindrical tubes 20 and 22 are preferable formed from easily magnetized metallic material for the reasons presently believed apparent. The bore of the inner tube 20 is closed by a plug 26 formed from nonmagnetic metallic material. A pair of bar magnets 28 and 30 of predetermined cross sectional area and a length substantially equal with the length of the tubular members 20 and 22 are longitudinally interposed in the annulus in diametric opposition.

The north pole surface of each magnet is disposed in contiguous contact with the inner wall surface 32 of the outer tube 22 and similarly the south pole surface of each magnet is in contiguous contact with the outer wall surface 34 of the inner tube 20. The magnets 28 and 30 divide the annulus to form diametrically opposite part-circular fluid passageways 24 and 25. The outer cylindrical tube 22 forms a magnetic flux north monopole repelling force, and similarly the inner cylindrical tube 20 forms a south magnetic monopole repelling force. The concentrated magnetic field flux lines between the monopole annulus forming fluid passageways 24 and 25 are normal to the inner wall surface 32 of the outer tube 22 and outer wall surface 34 of the inner tube 20 and orthogonal to the direction of fluid flow through the passageways.

The end caps 14 and 16 are substantially identical and only the end cap 16 is described in detail in the interest of brevity. The end cap 16 has one closed end 36 and is bored and counterbored from its other end as at 38 and 40 (FIG. 4) to define an annular shoulder 42 which abuts the adjacent end surface of the outer tube 22 when the cap is disposed over the adjacent end thereof. The cap 16 is provided with a plurality of circumferentially spaced bores 44 extending through its annular shoulder 42 in alignment with a like plurality of bores 46 formed in the wall of the outer tube 22 for receiving bolts and nuts 48 joining the end cap with the tubes 20 and 22 to complete the tube assembly 12.

A plurality of dowels 50 are interposed between the inner surface of the end wall 36 and the adjacent end surface of the inner tube 22 to preclude axial movement of the latter relative to the outer tube or magnets.

The cap end wall 36 is axially bored as at 52 and threaded for cooperative reception of the flow line 18 when interposed therein.

In the operation of the embodiment of the structure 10, fluid from the flow line 18 entering the chamber 53 formed by the upstream cap 14 experiences a pressure drop and a change of direction before entering the passageways 24 and 25 containing the magnetic flux field which excites electrons and results in atoms of different charges expelling or absorbing a free electron to satisfy it valence unbalance. Similarly, the fluid entering the downstream cap chamber 54 changes direction thereby assuring a further mixing of the fluid to induce coagulation of charged ions or particles for separation from the fluid as by a filter or settling out in a still column, not shown.

In a test of the efficiency of automotive fuel conditioning the device 10 was installed on a Fleetwood Bounder 40 foot gasoline powered motor home and the miles per gallon compared with a trip from California to Arkansas without the device 10 and on a return trip using the device. An 11% increase in fuel mileage was realized on the return trip using the device with a noticeable increase in the available horsepower.

One of the devices 10 was installed on a 1990 Toyoto Camray V6 averaging approximately 24–26 mpg highway driving without the device which increased to 30–31 mpg highway driving using the device and 20–21 mpg in city driving without the device which increased to 27–28 mpg using the device. Further the spark plugs of this vehicle show virtually no wear after 30,000 miles.

The action of the charged particles decreases the scale or buildup on the walls, if present, of a heat exchanger or like devices and tends to preclude scale build-up on the inner wall surfaces of the flow line 18 or vessels containing fluid from the line 18.

Referring also to FIGS. 5–8, another embodiment of the structure is indicated at 110 which is similar to the embodiment 10 and like parts contain like reference numerals and modified parts utilize the 100 series numeration.

In this embodiment, the end caps 114 and 116 are modified as will now be described for the end cap 116. The bore 138 is provided with a diametric partition 160 having a width substantially equal to the transverse width of the magnets 28 and 30 and a top surface 162 in the plane of the shoulder surface 42.

When assembled with the tube assembly 12 the partitions 160 extend diametrically across both ends of the tube assembly in the position of the magnets 28 and 30 (FIG. 6), thus forming a pair of chambers 153 and 154 at respective ends of the tube assembly adjacent the inner wall surface of the respective cap 114 and 116. The closed end 136 of each cap is provided with a pair of threaded bores 164 respectively communicating with the chambers 153 and 154 for similarly receiving a pair of fluid conduits 118 and 119 when the structure 110 is interposed between these lines.

The operation of the structure 110 is substantially identical with that described hereinabove for the structure 10 with the added advantage that the embodiment 110 provides a magnetic treatment device for fluid from two different systems flowing through the passageways 124 and 125.

Referring also to FIGS. 9–12, another version of the structure is indicated at 210 in which identical parts bear reference numerals identical with the embodiment 10 and modified parts contain numerals in the 200 series.

In this embodiment the end cap 214 is substantially identical with the end cap 14 of the embodiment 10 and is connected with the flow line 18. The end cap 216 is substantially identical with the end cap 116 of the embodiment 110, having a partition 260 dividing the bore 238 to form a pair of chambers, 254 when joined with the tube assembly 12, and its closed end wall 236 is similarly is provided with a pair of threaded bores 264 for receiving fluid outlet pipes or conduits 218 and 219.

In the operation of the embodiment 210, fluid entering the upstream compartment is similarly changed in direction to enter the passageways 124 and 125 which are individually connected with the outlet pipes 218 and 219, thus providing a magnetic fluid treatment device which divides the fluid from a common source to be transferred downstream to individually separate systems.

Obviously, the fluid flow may be reversed so that it enters the structure 210 from two different systems through the pipes 218 and 219 and is combined in a downstream direction exiting the structure 210 through the fluid flow line 18.

Referring now to FIGS. 13-16, an additional embodiment of the structure 10 is indicated at 310 in which identical parts bear identical reference numeral and modified parts are designated in the 300 numeral series.

In this embodiment, the end cap 314 is similarly provided with a partition wall 360 dividing its bore 338 to form a pair of upstream chambers 353 respectively connected with a pair of threaded bores 364 and fluid conduits or pipes 318 and 319. The downstream end cap 316 is similarly modified by eliminating the threaded bores and its imperforate closed end wall 336 forms one end of a single chamber communicating with the passageways 324 and 325.

In operation, fluid enters one of the upstream chambers from one of the flow lines 318 or 319 and after passing through one of the magnetic flux passageways 324 and 325 between the inner and outer tubular members 20 and 22 is reversed in direction to flow out through the opposite magnetic flux passageways, thus subjecting the fluid to a second magnetic treatment action to insure a thorough magnetic flux concentration on the ions or particles in the fluid for charging or changing polarity when in the magnetic field.

Referring now to FIGS. 17-21, an additional embodiment of the device 10 is indicated at 410 containing a modification of the tube and magnet assembly 412 which is substantially identical with the tube assembly 12 except for the addition which will now be described.

The inner wall surface 432 of the outer tube 422 and the outer surface 434 of the inner tube 420 are provided with opposing cooperating part circular recesses 466, formed by passing a drill bit, not shown, through the magnetic passageways 424 and 425, for nesting diametrically opposite peripheral portions of a plurality of pairs (3) of magnetizable tubes 468,470, and 472 coextensive with tubular assembly 412.

One end of the tubes 468,470,472 are connected with one wall of a tank 474 having a diametric partition 476 forming a pair of compartments 478 respectively communicating with the ends of the pairs of tubes 468,470,472. The other ends of the pairs of tubes 468,470,472 are connected together by a like plurality of return bends 468',470' and 472'. A pair of fluid conductors or flow lines 418 and 419 are respectively connected with the tank 474 in communication with the respective pair of tank chambers 478.

Operation of the embodiment of the structure 410 is similar to that described for the embodiment 310 in that fluid entering the tank compartments 478 experiences a small pressure drop when entering a respective compartment and changes direction in a U-turn action by entering and passing through one of the pairs of tubes 468,470,472 return bends and out the other tube of the respective pair, thus changing flow direction of the fluid, not only in the compartments 478 but also in the return bend action and subjecting the fluid to a second influence of the magnetic flux surrounding the tubes 468,470,472.

FIG. 22 illustrates a further modification of the embodiment illustrated by 410 in which the return bends for the pairs of tubes are eliminated and an upstream tank 474' is connected with one end of the pairs of tubes and a downstream tank 474" is provided at the opposite end of the tube assembly 412 and connected with the other ends of the pairs of tubes 482,480,484 which exits through the downstream flow line 419'. The principal feature of the embodiment of FIG. 22 is that the fluid from the upstream line 418' enters the tank 474' in axial offset relation with the respect to the axis of the pairs of tubes or pipes 480,482,484 and similarly change direction after passing through the magnetic field in a downstream direction to exit the downstream flow line 419' which is axially offset with respect to the upstream inlet line 418'.

Figure 23:
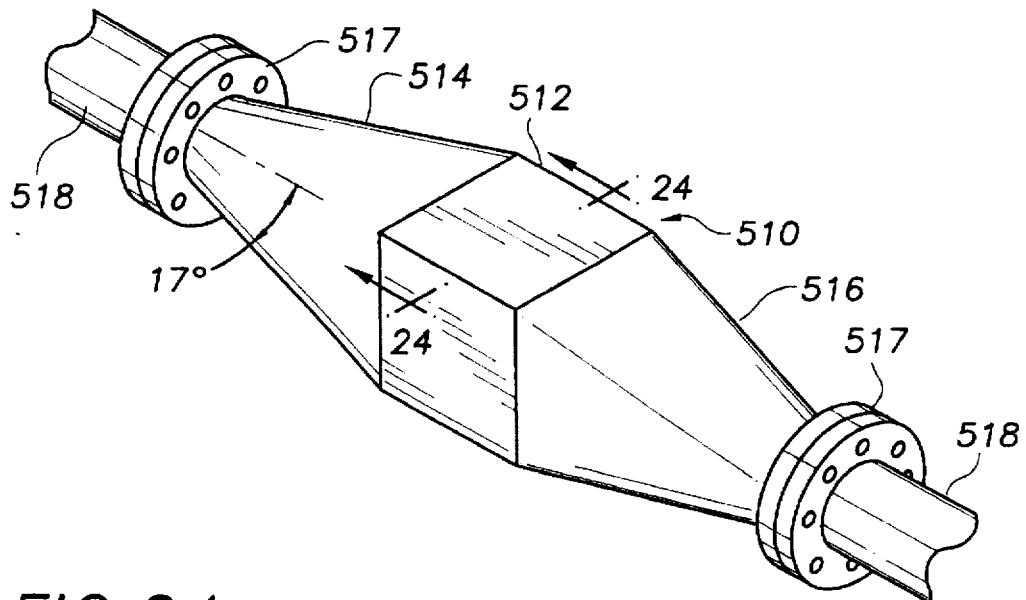
FIG. 23 is an isometric view of another embodiment.
Figure 24:
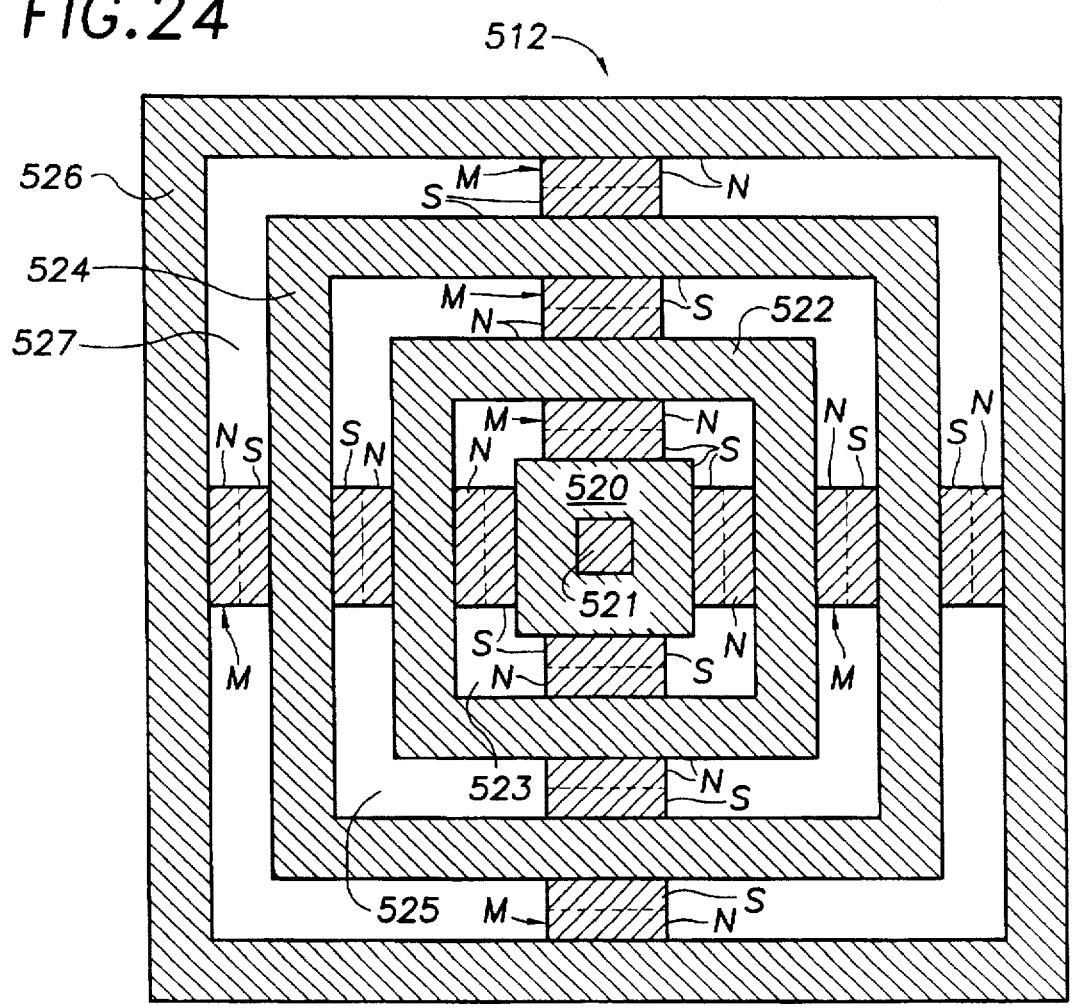
FIG. 24 is a vertical cross sectional view, to an enlarged scale, taken substantially along the line 24—24 of FIG. 23.

Referring now to FIGS. 23 and 24, the reference numeral 510 indicates a commercially successful water treatment device which minimizes the formation of scale such as struvite on the inner wall surfaces of a flow line 518, a heat transfer device or pump, neither of which are shown.

The device 510 is rectangular in general configuration formed by a tube assembly 512 connected at its respective ends with truncated conical flange end reducers 514 and 516 to be interposed between like flanges 517 in the flow line 518. The angle of taper of the reducer outer wall preferably being no greater than 17 degrees with respect to the longitudinal coaxes axis of the device 512 and the line 518. One flange end portion of the line 518 preferably being nonmagnetic material to preclude magnetic interference with pump motors or other equipment. The tube assembly 512 comprises a plurality (4) square in cross section equal length tubular members arranged in parallel spaced apart relation about a common longitudinal axis (FIG. 24) numbered 520, 522, 524, and 526.

The opening or annulus of the innermost tube 520 is closed by a nonmagnetic plug 521 for the reason the inner peripheral surface is nonmagnetic in its medial portion and when polorized as a south magnetic pole flux density is concentrated at its respective end portions such that a soft iron ball manually inserted into either end thereof is forcibly repelled out of the tube. The three annuli 523, 525, and 527 formed by the spacing between the several tubular members 520, 522, 524, and 526 is of predetermined cross sectional area sufficient to accommodate liquid flow through the flow line 518 with minimum or no pressure reduction across the position of the tube assembly 512 for the reasons believed obvious.

A plurality (4) bar magnets M are interposed in the respective annulus 523, 525, and 527 in 90° spaced relationship and extend longitudinally between and in contiguous contact with the respective adjacent wall surfaces of the several tubular members. The permanent magnets M are preferably high intensity ceramic magnets manufactured by T.D.K. Company of Shawnee, Okla. 74801 having one longitudinal surface defining a north magnetic pole and an opposite longitudinal surface defining a south magnetic pole.

The magnets in the annulus 523 have their south magnetic pole contacting the outer wall surfaces of the innermost tube 520 and their north magnetic pole surfaces contacting the inner surface of the tube 522.

Conversely, the four magnets in the annulus 525 have their north pole contacting the outer surface of the tube 522 and their south poles contacting the inner surface of the tube 524.

The several magnets in the annulus 527 are disposed identically with the magnets in the annulus 523. Namely, their south poles contact the outer surface of the tube 524 and the north poles contacting the inner surface of the outermost tube 526. Thus, it may be seen that the tubes 520 and 526 are, respectively, south and north magnetic monopoles. The tubes 522 and 524 are magnetic monopoles having their outer and inner endless perimeter magnetized by the north or south magnetic pole of the respective magnets M interposed between the tubes 522 and 524.

The magnetic flux field in the respective annulus 523, 525, and 527 extends between adjacent surfaces of the several tubes normal to the plane of the respective tube wall and normal to the direction of fluid flowing through the respective annuli.

Obviously, one of the reducers 514 or 516 can be omitted and the resulting open end of the tube assembly 512 act as a fluid pickup opening.

Any one of the above described devices 10 through 510 will support and operate an electric motor armature when mounted in one of the annuli such as described in my U.S. Pat. No. 5,212,418.

As an example, of the effectiveness of the unit 510 inhibiting sturvite crystallization in pumps and associated water lines Murphy Family Farms of Miami, Okla., a swine production facility was experiencing problems in the crystallization build up in a water treatment sewage pump in a lagoon. Maintenance personnel found it necessary to remove the pump from service each two to three months to acidize its interior with a sulfuric acid solution. Without this treatment in a period of 60 to 90 days the crystallization would accumulate to one inch in thickness and ultimately require the cleaning process. On Feb. 6, 1996 one of the units 510 was installed by B & L Waterworks of Oklahoma, Miami, Okla. adjacent the intake of the sewage pump. On Apr. 16, 1996 the pump was removed and after 70 days there was no substantial accumulation of the crystallization. The same result was observed after 110 days of using the unit 510.

In order to observe the fluid before and after entering the unit 510, transparent piping was installed at each end of the unit. A large air bubble entering the unit was collapsed into a multitude of relatively small size bubbles, less than 3.18 mm (⅛ inch) in diameter, on the downstream side of the unit 510. Some of these small bubbles were observed to migrate upstream against the flow toward the unit 510.

Figure 25:
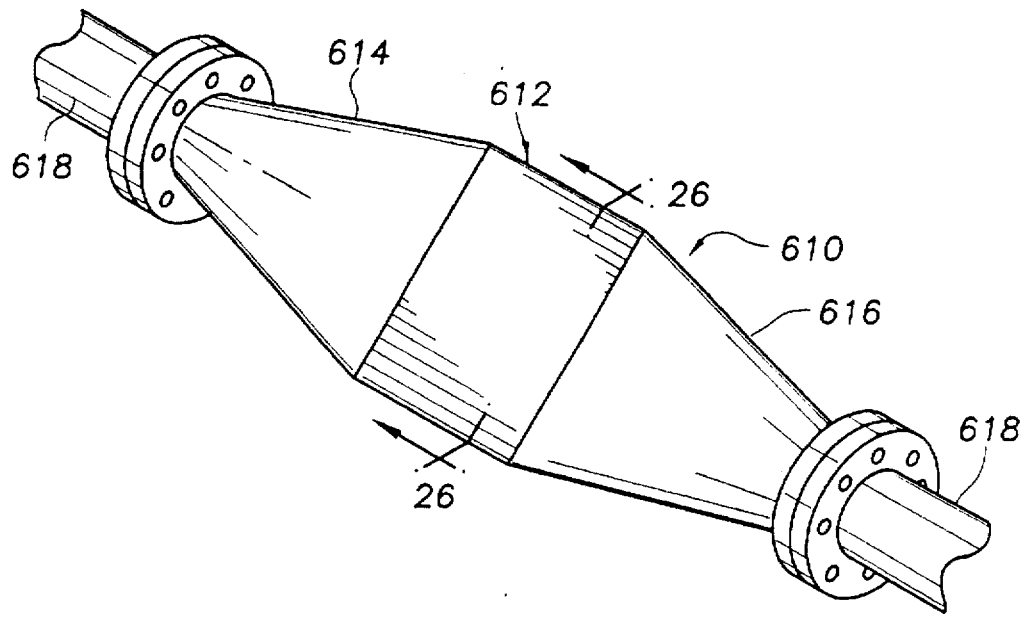
FIG. 25 is a perspective view of another embodiment.
Figure 26:
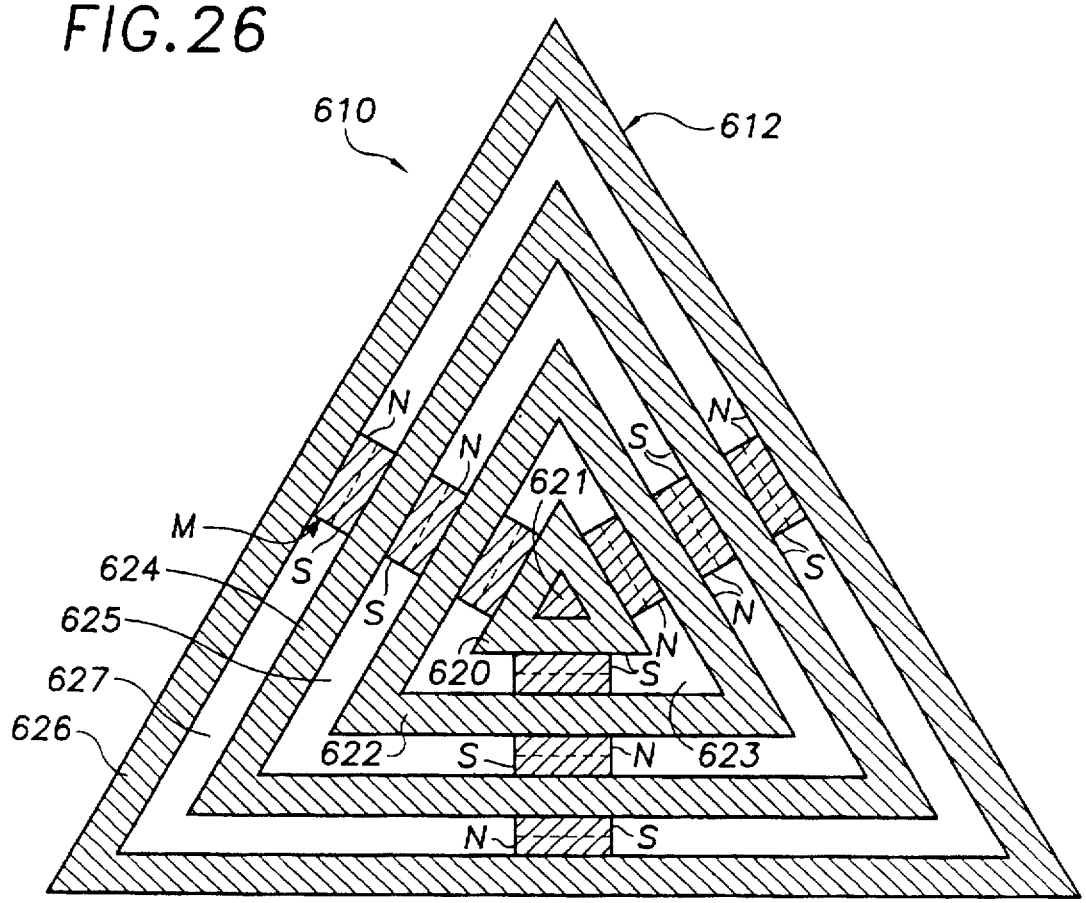
FIG. 26 is a vertical cross sectional view taken substantially along the line 26—26 of FIG. 25.

Referring also to FIGS. 25 and 26, the reference numeral 610 indicates a further embodiment of the magnetic water treatment apparatus similar to the embodiments of FIGS. 23 and 24.

In this embodiment, the coaxial tube assembly 612 is formed from a plurality of equal length tubes substantially equal lateral triangular in transverse cross section. The plurality of tubes (4) indicated at 620, 622, 624, and 626 with their walls arranged in equal spaced relation define a plurality of annuli 623, 625, and 627 through which water from the pipe 618 flows from adapters 614 and 616 connecting the tube assembly 612 with the pipe line 618.

In this embodiment, a plurality (3) of the permanent magnets M are similarly disposed in the respective annuli and respectively form south or north magnetic monopoles of the tubes 620, 626, and 622 and 624.

Referring also to the remaining FIGS. 27, 28, and 29, another embodiment similar to the structure 10 for magnetically treating fluids for the oil well industry is indicated at 710 comprising a pair of coaxial tube assemblies 712 containing diametrically opposite magnets 713 connected in axial alignment by box and pin subjoints 786 and 788.

In this embodiment, respective end portions of the outer tube 722 are externally threaded for receiving cooperating internally threaded end portions of a subjoint box, as at 789, and the internally threaded end portion of a pin sub 788, as at 790. The subjoint 786 is provided with internal threads 791 and similarly the pin end subjoint 788 is provided with external threads 792.

The drawings illustrate threads used for drill pipe, however, it is believed obvious that the subjoints may have the pin and box end threads 791 and 792 formed for tubing or casing threads, not shown, if desired to utilize the tubular member 712 in a producing well to minimize or eliminate basic sediment components buildup, such as paraffin, on the inner wall surfaces of oil production tubing, flow lines, separators, storage tanks or other containers.

Operation of this embodiment seems obvious in that fluid flowing in the direction of the arrows 793 through the tube assemblies 712 passes through the similar magnetic flux fields of annuli or passageways 724 and 725 of the subjoints 786 and 788 of the respective tube and magnetic assembly 712.

Obviously the invention is susceptible to changes or alterations without defeating its practicability. Therefore, I do not wish to be confined to the preferred embodiment shown in the drawings and described herein.

I claim:

1. Apparatus for subjecting fluid moving through a conduit to a magnetic flux repelling force normal to the direction of fluid flow, comprising:

coaxial inner and outer tubular members of magnetically receptive material forming pole pieces having continuous plane pole faces disposed in face-to face spaced parallel confronting relationship and axially connected with said conduit; and, magnetic flux providing means disposed between the pole faces forming a monopole repealing force from like polarity magnetic poles around the entire perimeter of the respective tube of said tubular members and defining with said pole faces passageways between said pole faces, said flux providing means being poled to render the confronting pole faces of opposite monopole polarity and a magnetic flux attracting field between the pole faces of adjacent pole pieces normal to the central axis of the tubular members, said pole pieces being of a thickness in a direction normal to said plane such that the reluctance of the pole pieces is small compared to the reluctance of the magnetic path through the flux providing means, whereby a magnetic attracting flux field of high homogeneity is produced within the passageways.

2. Apparatus according to claim 1 in which the magnetic flux providing means is symmetrically disposed with respect to said passageways.

3. Apparatus according to claim 1 in which the magnetic flux providing means includes:

permanent magnets.

4. Apparatus according to claim 1 and further including:

nonmagnetic material closing a central opening of the inner tube of said coaxial inner and outer tubular members.

5. Apparatus according to claim 4 and further including: an end cap interposed between said tubular members and said conduit.

6. Apparatus according to claim 5 in which said tubular members are polygonal in cross section.

7. Apparatus according to claim 6 in which said tubular members are circular in cross section.

8. Apparatus for subjecting fluid moving through a conduit to a magnetic flux repelling force field normal to the direction of fluid flow, comprising:

a plurality of coaxial inner and outer tubular members for forming magnetic pole pieces axially connected with said conduit and forming a plurality of flow passageways; and, magnetic flux providing means dividing the passageways forming a monopole repelling flux force from like polarity magnetic poles in the respective tube of said tubular members, said flux providing means being poled to render the polarity of confronting pole faces of adjacent tubular members of said plurality of tubular members of opposite monopole polarity, each of said pole pieces being of a thickness in a direction normal to said passageways such that the reluctance of the pole pieces is small compared with the reluctance of the magnetic path through the flux providing means, whereby a magnetic attracting flux field of high homogeneity is produced within the passageways.

9. Apparatus according to claim 8 in which the magnetic flux providing means is symmetrically disposed with respect to said passageways.

10. Apparatus according to claim 8 in which the magnetic flux providing means includes:

permanent magnets.

11. Apparatus according to claim 8 and further including:

nonmagnetic material closing a central opening of the inner-most tube of said tubular members.

12. Apparatus according to claim 11 and further including:

an end cap interposed between said tubular members and said conduit.

13. Apparatus according to claim 12 in which said tubular members are polygonal in transverse cross section.

14. Apparatus according to claim 13 in which said tubular members are circular in transverse cross section.

* * * * *

UNITED STATES PATENT AND TRADEMARK OFFICE
CERTIFICATE OF CORRECTION

PATENT NO. : 5,716,520
DATED : Feb. 10, 1998
INVENTOR(S) : Mason

It is certified that error appears in the above-identified patent and that said Letters Patent is hereby corrected as shown below:

In col. 10, line 34, change "repealing" to -- repelling --.

Signed and Sealed this

Twenty-sixth Day of January, 1999

Attest:

Attesting Officer

*Acting Commissioner of Patents and Trademarks*